United States Patent [19]

Johnson et al.

[11] Patent Number: 4,682,523
[45] Date of Patent: Jul. 28, 1987

[54] METHODS OF MAKING GLASS WOOL BLOWING INSULATION

[75] Inventors: Alan R. Johnson, Sylvania; Richard C. Yawberg, Grand Rapids, both of Ohio

[73] Assignee: Owens-Corning Fiberglas Corporation, Toledo, Ohio

[21] Appl. No.: 816,484

[22] Filed: Jan. 6, 1986

Related U.S. Application Data

[63] Continuation of Ser. No. 697,698, Feb. 4, 1985, abandoned, which is a continuation of Ser. No. 532,880, Sep. 16, 1983, abandoned.

[51] Int. Cl.$^4$ .............................................. B26D 7/08
[52] U.S. Cl. .......................................... 83/19; 83/42; 83/116; 83/176; 83/347; 83/675; 83/698
[58] Field of Search ............... 83/116, 117, 176, 346, 83/347, 663, 669, 670, 673, 906, 913, 37, 39, 698, 119, 675; 16/16, 162; 100/39, 95–97; 65/10.5, 172, 174; 76/107 C

[56] References Cited

U.S. PATENT DOCUMENTS

| | | | |
|---|---|---|---|
| 475,607 | 5/1892 | Petersen | 425/298 X |
| 807,420 | 12/1905 | Copland | 83/98 |
| 1,472,315 | 10/1923 | Welch | 83/117 |
| 2,113,843 | 4/1938 | Kalve . | |
| 2,829,692 | 4/1958 | Innocenti | 83/176 |
| 3,383,969 | 5/1968 | Saunders | 83/663 |
| 3,552,244 | 1/1971 | Smith, Jr. | 83/116 |
| 3,555,948 | 1/1971 | Olson | 83/117 |
| 3,941,038 | 3/1976 | Bishop | 76/107 C |
| 4,103,580 | 8/1978 | Sauer | 83/663 |
| 4,184,643 | 1/1980 | McCort | 241/87 |
| 4,193,272 | 3/1980 | Bernard | 83/408 X |
| 4,224,851 | 9/1980 | Imai | 83/117 X |

Primary Examiner—Frank T. Yost
Assistant Examiner—Hien H. Phan
Attorney, Agent, or Firm—Ronald C. Hudgens; Ted C. Gillespie; Paul J. Rose

[57] ABSTRACT

The method comprises cutting a glass wool blanket with a circular cutting grid having elastomeric plugs in the grid spaces. The cut columns and the plugs are both compressed. The cut columns are ejected by expansion of the plugs.

1 Claim, 5 Drawing Figures

4,682,523

METHODS OF MAKING GLASS WOOL BLOWING INSULATION

This is a continuation of application Ser. No. 697,698, filed Feb. 4, 1985, now abandoned which is a continuation of application Ser. No. 532,880, filed Sep. 16, 1983, now abandoned.

TECHNICAL FIELD

This invention relates generally to glass fiber thermal insulation, and more particularly to a method of making glass wool insulation pieces suitable for blowing into confined spaces such as attics of houses.

BACKGROUND ART

U.S. Pat. No. 4,296,164, issued to Bemis and McCartan on Oct. 20, 1981 discloses a method of making glass wool blowing insulation including slitting and crosscutting a glass wool blanket. The product didn't perform as well as desired.

U.S. Pat. No. 4,184,643, issued to McCort on Jan. 22, 1980 discloses a method of making glass wool blowing insulation including cutting a glass wool blanket with hollow rotary cutting grids, the cut product passing through the cutting grids into the central portions of the hollow rotary cutters.

DISCLOSURE OF INVENTION

In accordance with the invenion, a method of making glass wool blowing insulation is discloled wherein a glass wool blanket is cut by a rotary cutting grid in cooperation with a backup or anvil roll, and the grid spaces are closed at their radially inner ends and filled with elastomeric plugs. The cut product and the plugs are compressed between the closed inner ends of the grid spaces and the anvil roll and the product is ejected by the plugs as the cutting grid rotates past the area of contact with the anvil roll. The product is more thermally efficient and less dusty than that produced by the apparatus of U.S. Pat. No. 4,296,164.

BRIEF DESCRIPTION OF DRAWINGS

The invention is hereinafter more full described with reference to the accompanying drawings in which.

BEST MODE OF CARRYING OUT THE INVENTION

Figure 1:
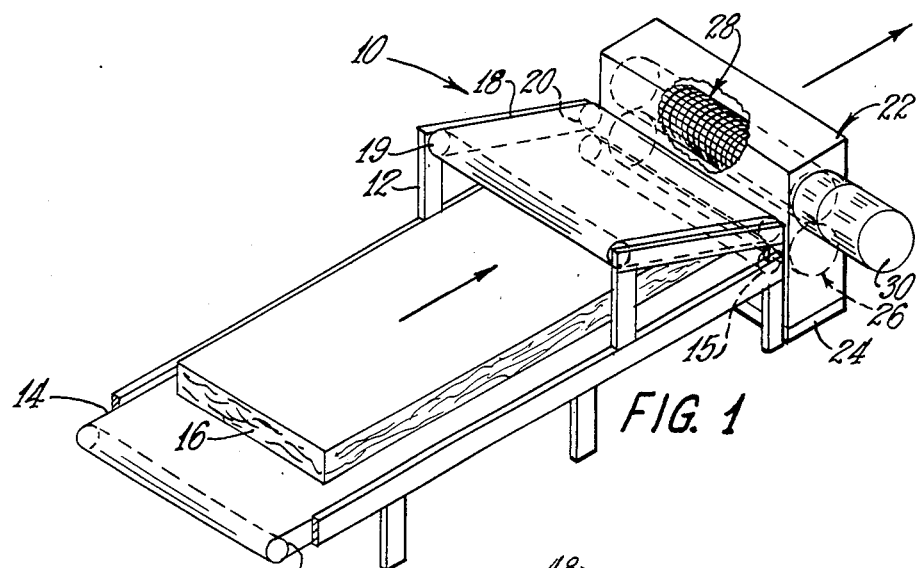
FIG. 1 is a fragmentary perspective view of apparatus for carrying out the method of the invention.

With respect to the drawings, FIG. 1 shows apparatus 10 for practicing the method of the invention. THe apparatus 10 includes a framework 12 for an endless conveyor belt 14 by which a glass wool blanket 16, formed of glass fibers bonded together with thermosetting resin such as urea-phenol-formaldehyde, is fed to a cutter 22. The conveyor belt 14 traverses a rear roller 13 and a front roller 15. Before reaching the cutter 22, the blanket 16 is partially compressed by a compression conveyor belt 18 traversing a rear roller 19 and a front roller 20. At least the lower flight of the conveyor belt 18 and the upper flight of the conveyor belt 14 are convergent in the direction of feed for the blanked 16. The cutter 22 includes a framework 24 for mounting a rotatable lower backup or anvil roll 26 and a cooperative upper rotary rule die or cutting roll 28 having suitable sriving means 30.

Figure 2:
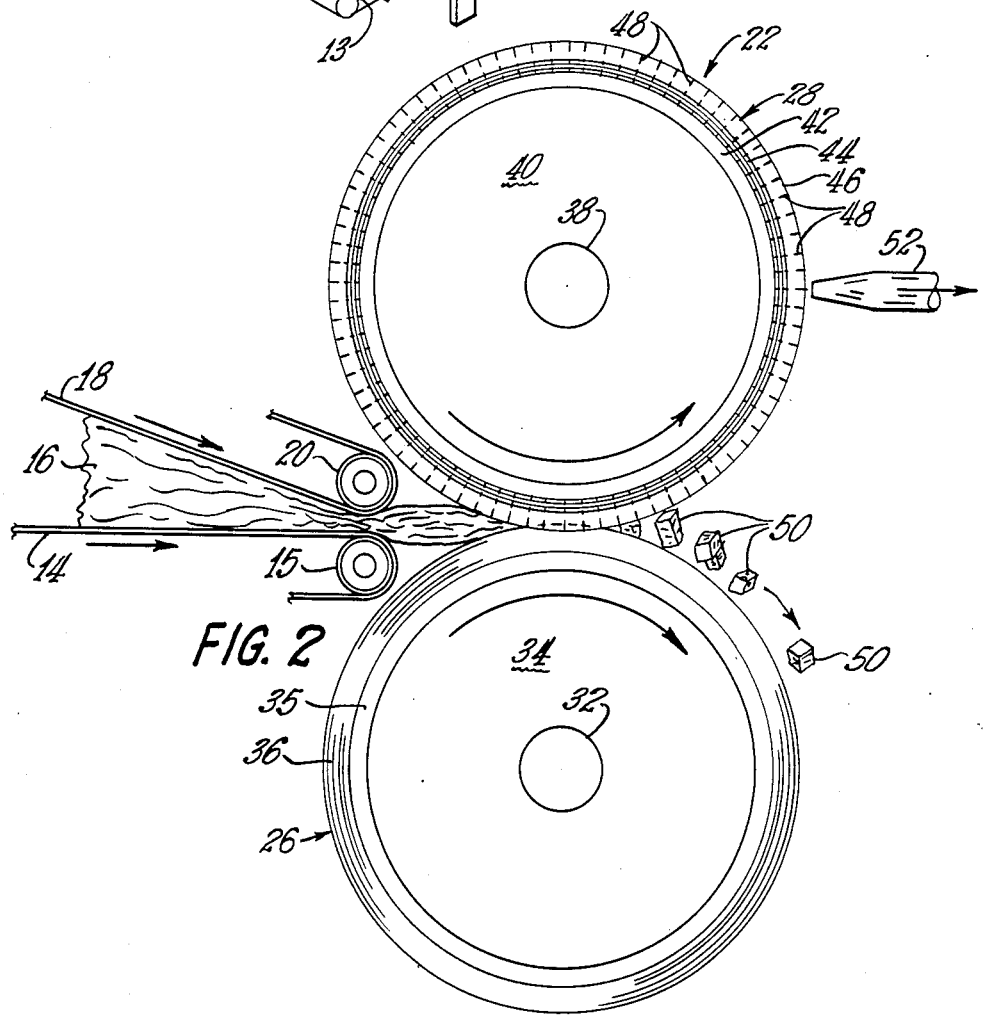
FIG. 2 is a transverse cross-sectional view of glass wool blanket cutting apparatus of FIG. 1.
Figure 3:
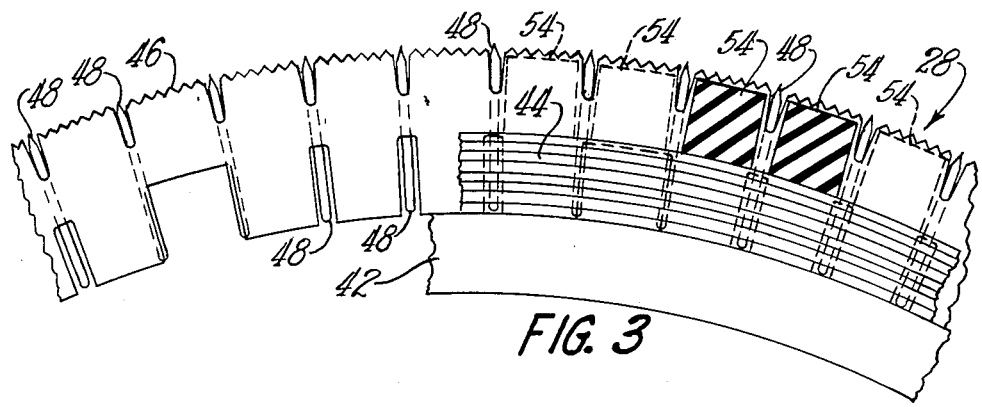
FIG. 3 is an enlarged fragmentary cross-sectional view of a cutting roll of FIG. 2.
Figure 4:
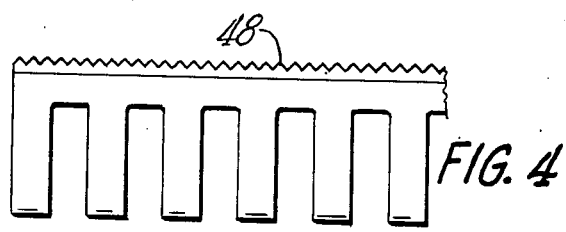
FIG. 4 is a fragmentary side elevational view of a straight cutting blade of a rotary cutting grid of the cutting roll of FIG. 2.
Figure 5:
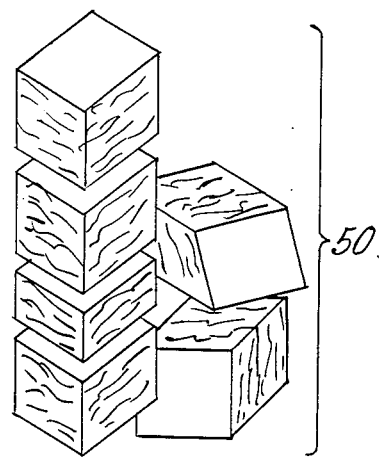
FIG. 5 is a perspective view of portions of the blowing insulation product formed by the cutting of a glass wool blanket.

As shown in FIG. 2, the backup or anvil roll 26 includes a mounting shaft 32, a pair of end caps 34 (only one being shown), a steel cylinder 35, and a resilient covering 36 therefor. The rotary rule die or cutting roll 28 includes a mounting shaft 38, a pair of end caps 40 (only one being shown), a steel cylinder 42, a laminated wood mounting cylinder 44 mounted on the cylinder 42 by suitable nuts and bolts (not shown) installed at appropriate places, and a circular cutting grid of circular blades 46 and straight blades 40 mounted in crossing and interlocking relationship on the laminated wood cylinder 44. Normally the laminated wood cylinder 44 is made in three 120-degree arcuate sections, as are each of the circular blades 46. Appropriate slits are provided in the wood cylinder 44 for the mounting of the blades 46 and 48, whose shapes are best shown respectively in FIGS. 3 and 4. Cut glass wool product 50 is shown in FIGS. 2 and 5. Preferably a suction nozzle 52 (FIG. 2) is provided to remove any scrap wool which remains on the cutting roll 28 after ejection of the glass wool product 50 therefrom. The blowing wool product is suitably conveyed from the cutting roll 28 to a bagging station by means not shown.

Each space in the cutting grid formed by the blades 46 and 48 is filled by an elastomeric or rubber plug 50 (FIG. 3) extending from the laminated wood cylinder 44 to the radially outer edges of the cutting blades 46 and 48. In the process of the invention, columns of glass wool cut from the blanket 16 ar compressed, along with the elastomeric plugs 50, against the laminated wood cylinder 44 by the covering 36 of the anvil roll 26. Upon further rotation of the cutting roll 28, the columns of glass wool expand to their free-state size and are ejected by expansion of the elastomeric plugs 54 to their free-state size. The columns of glass wool are subject to delamination into smaller pieces upon further handling and such pieces form the blowing insulation product 50.

We claim:

1. A process of making pieces of glass wool, suitable to be blown into attics as thermal insulation, from an elongated generally laminar resiliently compressible glass wool blanket having an original thickness in an unrestrained condition and being made of glass fibers bonded with thermoset resin, said process comprising feeding the blanket longitudinally through a compressing station wherein it is resiliently compressed from its original thickness to a smaller thickness, and feeding the compressed blanket longitudinally between a rotating backup roll and a cooperative rotating cutting roll from one side of the rolls, the cutting roll including a supporting cylinder, a plywood blade-mounting cylinder mounted on the supporting cylinder, a plurality of circular cutting blades each having a plurality of shank portions spaced from each other and disposed substantially complelely around an inner periphery of the blade, a plurality of straight cutting blades each having a plurality of shank portions spaced from each other and disposed substantially completely along a length of the blade, and a plurality of resiliently compressible plugs, the circular cutting blades respectively being separately mounted on the plywood cylinder circumferentially thereof, being distributed substantially throughout the length thereof, being spaced equally from each other axiallly thereof by a distance smaller than said original thickness of the blanket, and having their shank portions mounted respectively in slits extending substantially all the way through a wall thickness of the plywood cylinder, the straight cutting blades respectively being separately mounted on the plywood cylinder axially thereof, being distributed throughout the circumference thereof, being spaced equally from each other circumferentially thereof by a distance smaller than said original thickness of the blanket, having their shank portions mounted respectively in slits extending substantially all the way through the wall thickness of the plywood cylinder, and being arranged in a crossing and interlocking relationship with the circular cutting blades, and the resiliently compressible plugs being mounted on the plywood cylinder, being disposed respectively in spaces defined by the cutting blades, and having outer surfaces radially within but substantially flush with cutting edges of the blades, whereby the compressed blanket is cut into columns, the columns are compressed respectively against the resiliently compressible plugs and confined temporarily in the spaces defined by the cutting blades and radially within the cutting edges of the blades, and the plugs are compressed against the plywood cylinder as the blanket passes between the backup roll and the cutting roll, and the columns are expelled from the cutting roll by the resiliently compressed plugs upon passing to the other side of said rolls, the spacing of the circular cutting blades from each other and the spacing of the straight cutting blades from each other being sufficiently small to provide columns sufficiently slender as to delaminate, due to their laminar structure, into smaller pieces at random upon being conveyed away from said rolls.

* * * * *